United States Patent
Luo et al.

(10) Patent No.: US 8,280,164 B2
(45) Date of Patent: Oct. 2, 2012

(54) PRODUCING OBJECT CUTOUTS IN TOPICALLY RELATED IMAGES

(75) Inventors: Jiebo Luo, Pittsford, NY (US); Dhruv Batra, Pittsburgh, PA (US); Andrew C. Gallagher, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 882 days.

(21) Appl. No.: 12/397,547

(22) Filed: Mar. 4, 2009

(65) Prior Publication Data

US 2010/0226566 A1 Sep. 9, 2010

(51) Int. Cl.
*G06K 9/34* (2006.01)
(52) U.S. Cl. .................................... 382/173; 382/206
(58) Field of Classification Search ........... 382/170–180
See application file for complete search history.

(56) References Cited

U.S. PATENT DOCUMENTS

| | | | | |
|---|---|---|---|---|
| 7,630,549 | B2 * | 12/2009 | Aharon et al. | 382/173 |
| 7,676,081 | B2 * | 3/2010 | Blake et al. | 382/164 |
| 2005/0105775 | A1 * | 5/2005 | Luo et al. | 382/115 |
| 2006/0285747 | A1 * | 12/2006 | Blake et al. | 382/180 |
| 2007/0081712 | A1 * | 4/2007 | Huang et al. | 382/128 |

OTHER PUBLICATIONS

Schnitman et al. "Inducing semantic segmentation from an example" ACCV 2006.*
"Interactive Graph Cuts for optimal boundary and region segmentation of objects in N-D images" Proceedings of the International Conference on Computer Vision IEEE 2001.*
Li et al, Lazy Snapping, ACM Transaction on Graphics, vol. 23, No. 3, Apr. 2004.
Boykov et al, Interactive Graph Cuts for Optimal Boundary & Region Segmentation of Objects in N-D images, International Conference on Computer Vision, vol. I, pp. 105-112, 2001.
Rother et al, GrabCut; interactive foreground extraction using interated graph cuts, ACM Transactions on Graphics, vol. 23, Issue 3, Aug. 2004.
Cui et al, Transductive Object Cutout, IEEE Conference on Computer Vision and Pattern Recognition, 2008.
Cao et al, Annotating Collections of Photos Using Hierarchical Event-Scene Models, Proc. of 2008 IEEE Conference on Computer Vision and Pattern Recognition (CVPR).
Comaniciu et al, Mean shift: a robust approach toward feature space analysis, IEEE Transactions on PAMI 24(5):603-619, 2002.
Batra et al, Semi-Supervised Clustering via Learned Codeword Distances, Proc. of 2008 British Machine Vision Conf. (BMVC).
Seung et al, Query by Committee, Proc. of 1992 COLT.
Leung et al, Contour continuity in region based image segmentation, Proc. of ECCV 1998.

* cited by examiner

*Primary Examiner* — Chan S Park
*Assistant Examiner* — Sean Motsinger
(74) *Attorney, Agent, or Firm* — Raymond L. Owens

(57) ABSTRACT

A method for extracting an object out of each image in a group of digital images that contain the object, includes providing a group of digital images, each containing the object with a background; selecting a seed image from the group of digital images, and displaying the seed image to a user; the user providing at least one marking for the seed image, which corresponds to a subset of pixels in the seed image that indicates whether the set of pixels belongs to a part of object of interest or a part of the background; producing from the seed image and the marking a statistical model that can be used for separating the object of interest from the background in the group of images; and applying the statistical model to each image in the group of digital images to produce a cutout of the object of interest from each digital image.

7 Claims, 3 Drawing Sheets

PRODUCING OBJECT CUTOUTS IN TOPICALLY RELATED IMAGES

FIELD OF THE INVENTION

The present invention is related to image processing, and in particular to producing object cutouts from a group of images containing an object of interest.

BACKGROUND OF THE INVENTION

Consumers frequently wish to extract objects of interest out of photographs. This can be for the purpose of creating new images by compositing the cutout on a novel background, or pasting multiple cutouts to create a collage. In certain graphics applications, the object of "interest" might actually be something the user wants to remove from a photograph, in which case the cutout is usually filled in with techniques like texture synthesis or in-painting.

The classical instance of object cutout was of course, the cutting of objects out of magazines or books with scissors. The advent of digital cameras, and image editing software like Adobe Photoshop introduced "Intelligent Scissors", which made the task of extracting objects out of digital images easier by requiring only a rough outline of the object of interest. Despite the success, this interface remains input-intensive, and requires a lot of detail and work from the user.

Fully automatic image segmentation is a difficult problem, because in addition to the large variation in appearance of objects, it is frequently a semantically ambiguous problem to even define objects or foreground without user input. A viable alternative solution to this problem is "Interactive Segmentation" or "Object Cutout". Object cutout is a tool that enables users to direct the segmentation algorithm towards a desired output via interactions in the form of scribbles, pixel seeds or bounding boxes around the object(s) of interest. These user interactions are used not only to construct image-specific foreground or background appearance models, but also to recover from mistakes made by the segmentation algorithm which are common in the case of complicated objects and cluttered scenes.

A number of researchers have attempted to make this task less tedious for the users. Li et al. (Yin Li, Jian Sun, Chi-Keung Tang and Heung-Yeung Shum, Lazy Snapping, ACM Transaction on Graphics, Vol. 23, No. 3, April 2004) and Boykov et al. (Yuri Boykov and Marie-Pierre Jolly, Interactive Graph Cuts for Optimal Boundary & Region Segmentation of Objects in N-D images, International Conference on Computer Vision, Vol. I, pp. 105-112, 2001), present techniques for object cutout that only require foreground and background seeds, i.e., a subset of image pixels marked as either foreground or background. Rother et al. (Carsten Rother, Vladimir Kolmogorov, Andrew Blake, "GrabCut": interactive foreground extraction using iterated graph cuts, ACM Transactions on Graphics, Vol 23, Issue 3, August 2004), on the other hand, work with an interface that requires a rough bounding box of the object of interest as input, and produces a cutout. However, all these methods require user input on all images from which a cutout is desired, which can be tedious considering that typical consumer image collection sizes run into thousands of images.

As powerful as this technique is, marking scribbles on images is a cumbersome process, one that puts severe limitations on the usefulness of this paradigm when image collections become large. For example, a user attempting to create a collage, from say thirty images, would have to scribble-and-segment all thirty images independently even though statistics could potentially be shared across images to reduce the required input.

More recently, Cui et al. (Jingyu Cui, Qiong Yang, Fang Wen, Qiying Wu, Changshui Zhang, Luc Van Cool, Xiaoou Tang, Transductive Object Cutout, IEEE Conference on Computer Vision and Pattern Recognition, 2008) presented a work that learns a statistical foreground model from a single image, and applies the cutout process to multiple images. However, a number of issues remain unresolved: How are images grouped into collections containing the same of object of interest? How is the image for marking scribbles chosen from the collection? How does the statistical model guarantee relevance to other images in the collection?

There is a need for a semi-automatic, intelligent, and reliable process that takes a consumer image collection, splits the collections into groups of topically related images, presents seed image(s) from each group to the user for pixel seeds, and based on these pixel seeds provides object cutout on all images in a group.

SUMMARY OF THE INVENTION

The present invention is directed to overcoming one or more of the problems set forth above. Briefly summarized, according to one aspect of the present invention, the invention resides in a method for extracting an object of interest out of each image in a group of digital images that contain the object of interest, comprising:

(a) providing a group of digital images, each containing the object of interest with a background;

(b) selecting a seed image from the group of digital images, and displaying the seed image to a user;

(c) the user providing at least one marking for the seed image, which corresponds to a subset of pixels in the seed image that indicates whether the set of pixels belongs to a part of object of interest or a part of the background;

(d) producing from the seed image and the marking a statistical model that can be used for separating the object of interest from the background in the group of images; and (e) applying the statistical model to each image in the group of digital images to produce a cutout of the object of interest from each digital image.

The present invention provides a method for object cutout having the advantage of (1) ensuring that the required user input is reduced by reutilizing markings within a group with the help of the produced statistical model, (2) automatically creating groups of related images based on metadata or visual similarity, (3) smartly selecting seed image(s) within a group so as to increase the efficacy of the user markings, and (4) smartly indicating areas in the seed image where the user marking is helpful.

These and other aspects, objects, features and advantages of the present invention will be more clearly understood and appreciated from a review of the following detailed description of the preferred embodiments and appended claims, and by reference to the accompanying drawings.

DESCRIPTION OF THE METHOD

Figure 1:
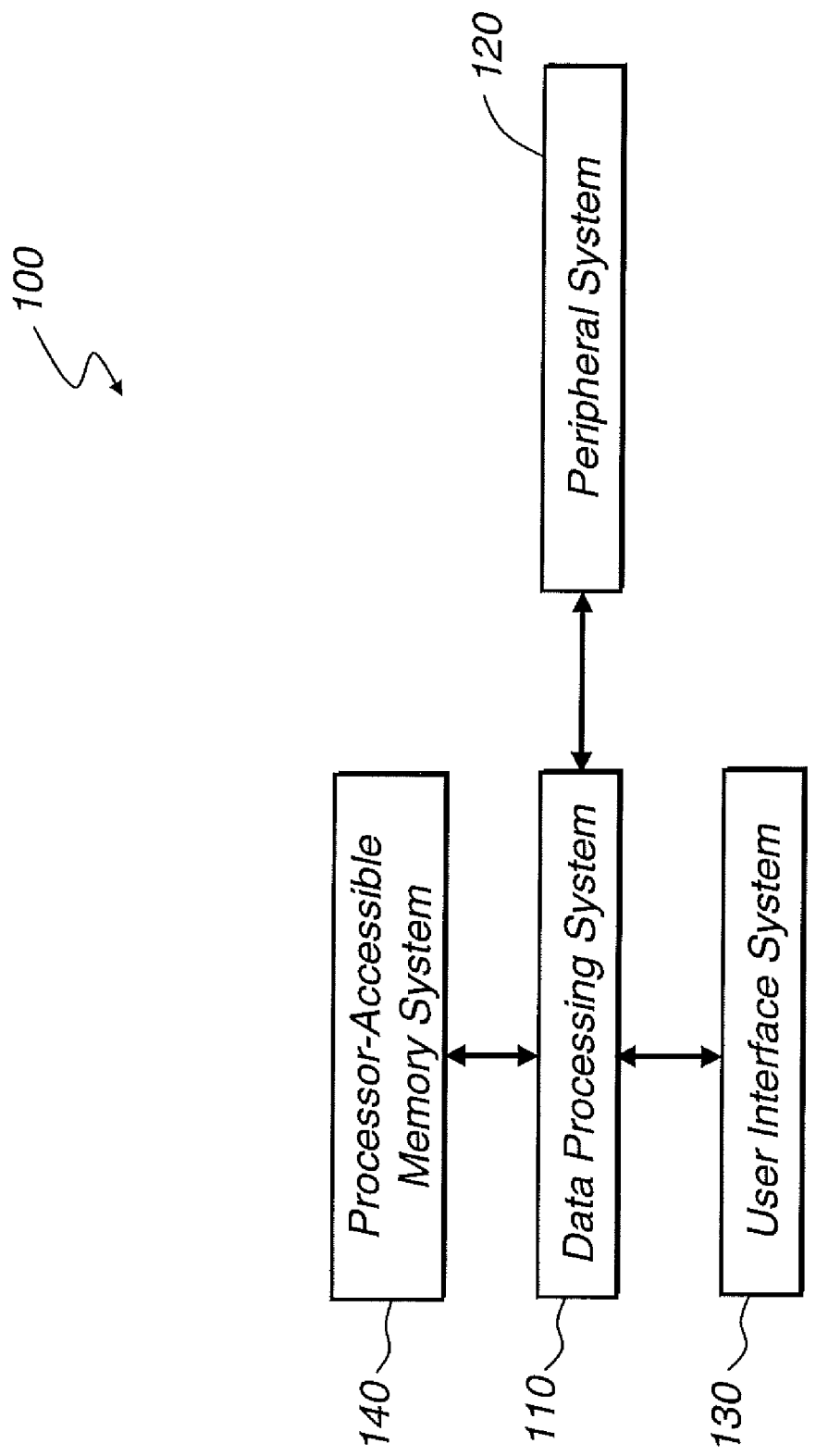
FIG. 1 is pictorial of a system that can make use of the present invention.

FIG. 1 illustrates a system 100 for assigning semantic labels to photos, according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

The data processing system 110 includes one or more data processing devices that implement the processes of the various embodiments of the present invention, including the example processes of FIGS. 1 and 1a. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 can be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory system 140 even though the user interface system 130 and the processor-accessible memory system 140 are shown separately in FIG. 1.

Figure 2:
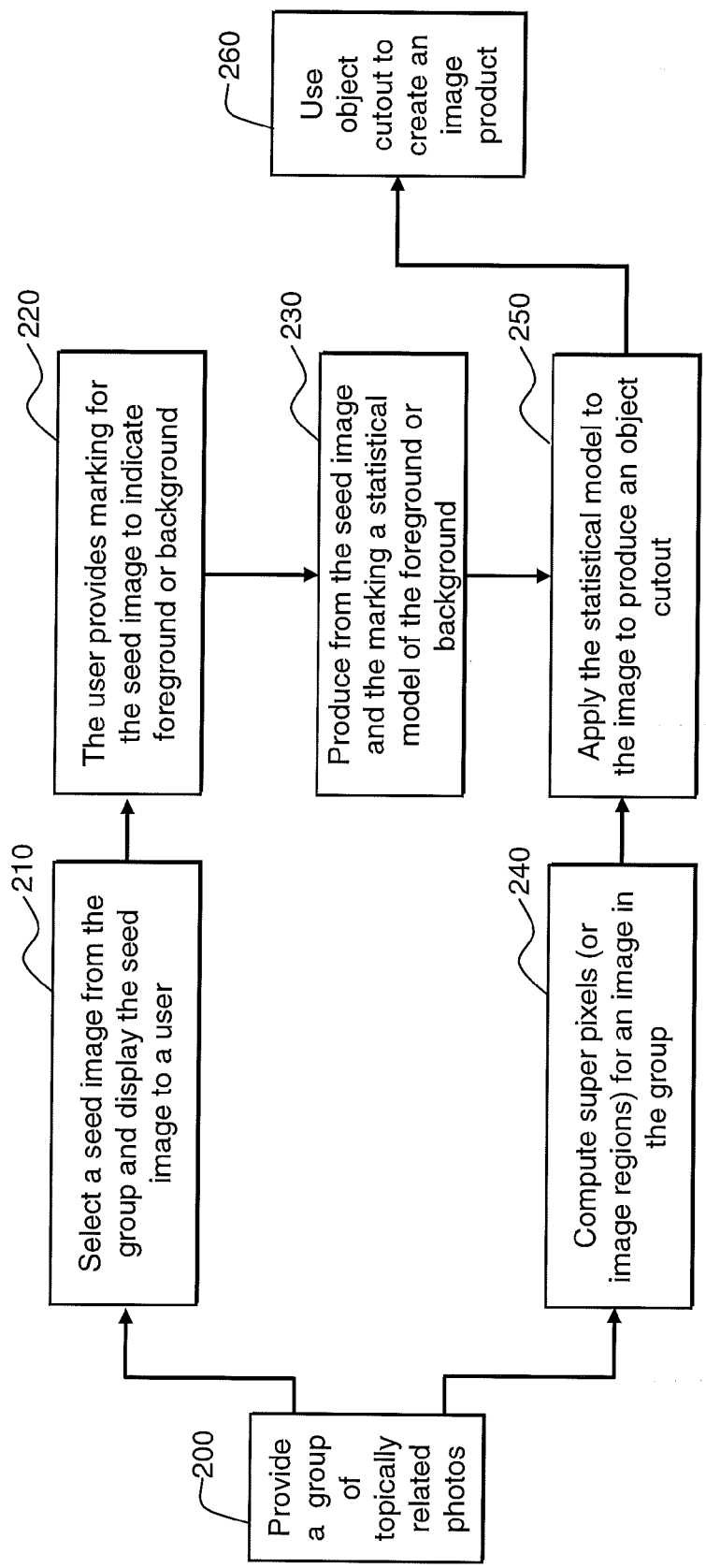
FIG. 2 is a flow chart for practicing an embodiment of the invention.

Referring now to FIG. 2, the present invention includes a few steps which can be described individually. The input to the method is a collection of images, along with associated metadata. Associated metadata might include information such as date stamp, geotags, camera parameters (focal length), user notes or labels, or other input available on these images. The first step in the present involves splitting this image collection into groups of related images by analyzing this metadata or visual similarity by a clustering process, e.g., k-means, which is well known in the art. A group of topically related photos is provided by such a clustering process 200. In one embodiment of the present invention, the method by Cao et al. "Annotating Collections of Photos Using Hierarchical Event-Scene Models," Proceedings of 2008 IEEE Conference on Computer Vision and Pattern Recognition (CVPR), is used.

The next step includes selecting a seed image from each group of images and displaying it to a user 210. One way to do this is to pick an image at random out of the group. One can also employ a heuristic that selects that image which includes the most non-informative distribution of visual features, which can be indicated by a high entropy on the distribution, among all images in the group. Visual features here might include color features, such as pixel RGB or the well-known HSV (hue-saturation-value) or CIELAB responses, or texture features, such as filterbank responses, or any other image descriptors.

Once this seed image is selected, it is displayed to the user via a user-interface on a display device (monitor, TV, phone screen), and user markings are received as input 220. User markings refer to a subset of image pixels, such that the user marking indicates whether the set of selected pixels belong foreground ("object of interest") or background. This user marking can be received via mouse, touch screen inputs (using a pen or finger), keyboard, or other input devices.

Once this user marking is achieved, the next step 230 is to learn a statistical model from these user markings along with the seed image, for each group in the collection. The learned statistical model has a learning of the likelihood for a feature vector belonging to foreground or background. In addition, the model also learns distances or affinities between features such that these distances reflect the input received via the user markings.

The next step is to apply this statistical model to each image in a group produce an object cutout 250. In a preferred embodiment of the present invention, a preparation step 240 takes place to compute superpixels (or image regions, each of which is a spatially contiguous set of pixels) for an image in the group. Computing superpixels is well known in the art, for example, Comaniciu and Meer, Mean shift: a robust approach toward feature space analysis, IEEE Transactions on PAMI, 24(5):603-619, 2002. Once superpixels are computed for a given image, object cutout is accomplished by feeding this statistical model and pairwise distances, into an energy minimization framework, which is minimized via graph-cuts. The minimal energy configuration in a preferred embodiment of the present invention gives rise to the optimal segmentation for each image in a group. For details, see Batra et al. Semi-Supervised Clustering via Learned Codeword Distances, Proceedings of 2008 British Machine Vision Conference (BMVC).

Finally, the object cutouts can be used 260 to create image products, including: creating a collage from the object cutouts in a group, removing unwanted object and filling in the resulting blank space by texture synthesis or in-painting, compositing one or more of the object cutouts on a new image background, or creating samples of the object for training a detector for the object.

Figure 3:
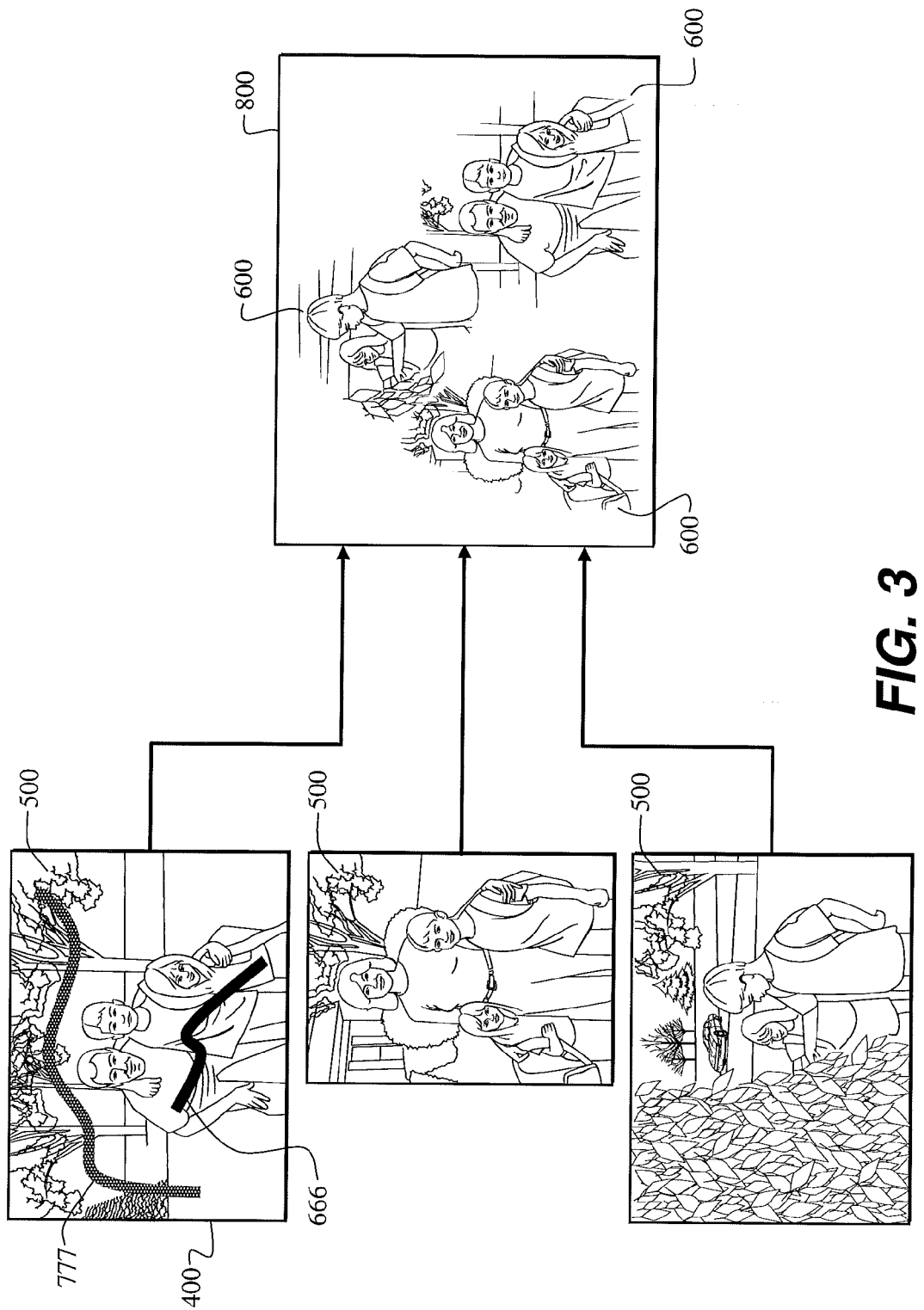
FIG. 3 graphically depicts an example of producing first object cutouts and then an image product for a group of topically related photos according to the present invention.

FIG. 3 depicts an example of the process of the present invention. A seed image 400 is selected, where a user marks a scribble for foreground objects 666 and a scribble for a background 777. Using the present invention, the foreground object cutouts 600 are separated from a background 500 in all the images in the group. Finally, an image product in the form of a photo collage 800 is created from the object cutouts.

In a further embodiment of the present invention, an active learning based algorithm is used to determine if the segmentation algorithm can guide the user to seek scribbles on the most confusing regions, thereby producing better cutouts and reducing the number of user interactions. This embodiment is one of uncertainty sampling, where in each step the segmentation algorithm quantifies its confusion about the current segmentation results, and presents the user with the most confusing regions to receive more scribbles. A plurality of cues is used to quantify the uncertainty about the current segmentation results, and they can be broadly categorized into uncertainty-based, scribble-based, and global image cues.

Among uncertainty-based cues, Node Uncertainty (NU) is related to uncertainty sampling, i.e., entropy of the data-term. Recall that each time scribbles are received, statistical models in the form of foreground and background GMMs (Gaussian Mixture Model) are fitted to the labeled superpixel features. Thus for all sites (superpixels) in the group, one can compute foreground and background likelihoods which are then normalized to compute posteriors, and ultimately entropies. The intuition behind this cue is that the more uniform the class distribution for a site, the more necessary it is to observe its label. Another cue is Edge Uncertainty (EU). The Query by Committee algorithm (see Seung, Opper, and Sompolinsky, Query by Committee, in Proceedings of 1992 COLT) is a fundamental work that forms the basis for many selective sampling works. The simple but elegant idea is to feed unlabelled data-points to a committee of classifiers and request labels for the data-point with maximal disagreement among committee classifier outcomes. The present invention uses this intuition to define out next cue. For each superpixel in the group, one use learned distances according to Batra et al. to find K (=10) nearest neighbors from the labeled set of superpixels. The proportion of each class in the returned list is treated as the probability of assigning this site as that class, and the entropy of this distribution is used as a cue. The intuition behind this cue is that the more uniform this distribution, the more disagreement there is among the returned neighbor labels, and the more one would like to observe the label of this site.

Scribble-based cues include Distance Transform over scribbles (DT) and Intervening Contours over scribbles (IC). For the first cue, the distance of every pixel from the nearest scribble location is computed. The intuition behind this cue is that one would like to explore regions in the image away from the current scribble locations because they potentially hold different features than sites closer the current scribbles. The second cue uses the idea of intervening contours (see Leung and Malik, Contour continuity in region based image segmentation, Proceedings of ECCV 1998), i.e., for each pixel in an image one finds maximal edge magnitude in the straight line to the closest scribble. This results in low confusions as one moves away from a scribble till a strong edge is observed, and then higher confusions on the other side of the edge. The motivation behind this cue is that edges in images typically denote contrast change, and by observing scribble labels on both sides of an edge, the distance learning algorithm can learn whether or not to respect such edges for future segmentations.

Finally, global image cues include Segment size (SS) and Codeword distribution over images (CD). It is observed that when very little data is observed, energy minimization methods typically over-smooth and results in "whitewash" segmentations (entire image labeled as foreground or background). This cue incorporates a prior for balances segmentations by assigning higher confusion scores to image with more screwed segmentations. In an embodiment of the present invention, class distributions for the image is obtained by normalization with respect to the size of foreground and background regions, and the inverse of the entropy of this distribution is used as the SS cue. This is an image level cue, and thus same for all regions in an image. The CD cue captures how diverse an image is, with the motivation being that scribbling on images containing more diversity among features would lead to better foreground or background models, and distance relationship between features learned by the distance learning algorithm according to Batra et al. To compute this cue, the features computed from all superpixels in the group is clustered to form a codebook, and the confusion score for each image is the entropy of the distribution over the codewords observed in the image.

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

Parts List

| | |
|---|---|
| 100 | system |
| 110 | data processing system |
| 120 | peripheral system |
| 130 | user interface system |
| 140 | processor-accessible memory system |
| 200 | step: provide a group of topically related photos |
| 210 | step: select a seed image from the group and display the seed image to a user |
| 220 | step: the user provides marking for the seed image to indicate foreground or background |
| 230 | step: produce from the seed image and the marking a statistical model of the foreground or background |
| 240 | step: compute super pixels (or image regions) for an image in the group |

-continued

Parts List

| 250 | step: applying the statistical model to the image to produce an object cutout |
| 260 | step: use object cutout to create an image product |
| 400 | seed image |
| 500 | background |
| 600 | objects of interest |
| 666 | user scribble for foreground objects |
| 777 | user scribble for background |
| 800 | image product (collage) |

The invention claimed is:

1. A method for extracting an object of interest out of each image in a group of digital images that contain the object of interest, comprising:
   (a) providing a group of digital images, each containing the object of interest with a background;
   (b) selecting a seed image from the group of digital images, and displaying the seed image to a user;
   (c) the user providing at least one marking for the seed image, which corresponds to a subset of pixels in the seed image that indicates whether the set of pixels belongs to a part of object of interest or a part of the background;
   (d) producing from the seed image and the marking a statistical model that can be used for separating the object of interest from the background in the group of images, wherein the statistical model includes:
      (i) learned likelihood for a feature vector belonging to foreground and background; and
      (ii) learned distances or affinities between features such that these distances reflect the input received via the user marking; and
   (e) applying the statistical model to each image in the group of digital images to produce a cutout of the object of interest from each digital image.

2. The method of claim 1, wherein step (a) further comprises:
   (i) providing a collection of digital images with associated metadata;
   (ii) analyzing either the metadata or image content or both to identify subsets of topically related digital images; and
   (iii) producing the group of digital images from the subset of similar images.

3. The method of claim 2, wherein:
   (i) metadata includes information having date stamp, geotags, camera parameters (focal length), user notes or labels; and
   (ii) image content is based on visual features including color features or texture features, or a combination of both.

4. The method of claim 1, wherein the seed image is selected from the group of digital images by:
   (i) randomly choosing an image out of the group; or
   (ii) a heuristic that chooses the image with the most non-informative distribution of visual features among all images in the group.

5. The method of claim 1, wherein:
   (i) a marking includes a scribble, stroke, rectangle, or other designation of a subset of image pixels, some of which are marked as belonging to foreground, while others belonging to background; and
   (ii) this marking is received via a user-interface on a display screen and via a user input devices.

6. The method of claim 1 further includes computing a plurality of cues, individually or in combination, including uncertainty-based, scribble-based, or global image cues, to indicate areas in the seed image where the user marking is helpful.

7. The method of claim 1 further includes using the object cutouts to produce an image product, including:
   (i) producing a collage from the object cutouts in a group;
   (ii) removing unwanted object and filling in the resulting blank space using texture synthesis or in-painting;
   (iii) compositing one or more of the object cutouts on a new image background; or
   (iv) producing samples of the object for training a detector for the object.

* * * * *